US005339349A

United States Patent [19]

Xeno

[11] Patent Number: 5,339,349

[45] Date of Patent: Aug. 16, 1994

[54] PORTABLE X-RAY UNIT

[76] Inventor: Millan Y. Xeno, P.O. Box 238, Davidson, NSW 2085, Australia

[21] Appl. No.: 966,433

[22] Filed: Oct. 26, 1992

[51] Int. Cl.[5] .............................................. H02M 3/335

[52] U.S. Cl. .................................... 378/101; 378/104; 378/207

[58] Field of Search ............... 378/117, 118, 114, 108, 378/109, 102, 101, 103, 110, 111, 112, 207, 104

[56] References Cited

U.S. PATENT DOCUMENTS

| | | | |
|---|---|---|---|
| 3,221,167 | 11/1965 | Weisglass | 378/107 |
| 3,511,996 | 5/1970 | Kusagaya et al. | 378/107 |
| 4,967,333 | 10/1990 | Callier et al. | 378/104 |

*Primary Examiner*—David P. Porta
*Assistant Examiner*—Don Wong
*Attorney, Agent, or Firm*—Bielen, Peterson & Lampe

[57] ABSTRACT

A light-weight portable x-ray unit utilizable in a field environment having a high voltage transformer and electronic circuitry for emulating a full-wave power supply to a radiation emitting x-ray tube.

8 Claims, 4 Drawing Sheets

PORTABLE X-RAY UNIT

BACKGROUND OF THE INVENTION

This invention relates to a light-weight, portable x-ray unit that can be utilized in a field environment. Portable x-ray units are primarily used in veterinary practices, but are useful in other emergency care situations where it is expeditious or more efficient to bring the x-ray unit to the patient than transport the patient to a facility having a standard medical x-ray machine.

It is expected that as the calibration and accuracy of portable units improve, widespread use of such units for the treatment of medical emergency patients will increase. Furthermore, portable units may have increased use in regions where hospitals or well equipped medical centers are unavailable. Such portable units are currently used for medical patients in nursing homes, where transport of the patient to a well-equipped facilities may be burdensome.

The existing inability to accurately calibrate a portable instrument for local conditions requires making multiple exposures at different settings to obtain useful diagnostic images. Not only does this entail unnecessary exposure, there is an uneconomical wastage of film, development chemicals and operator time. This greatly increases the cost of an x-ray examination.

Additionally, the extensive use of portable x-ray machines by veterinarians for examination of animals requires accuracy under a variety of operating conditions. Often use occurs in the field at the end of long extension cord for connection to a rural power source. Existing instruments are sensitive to low levels of source power and as a result may not operate at a consistent intensity. Also, a veterinarian must use a portable instrument on a variety of different animals where judgment of the operator is often critical given the diversity of animal species and size of animals, and the size of animal parts being examined. Frequently, the shortest exposure time on current equipment may be unduly prolonged for a very small animal or animal part, providing an uncorrectable over-exposure.

The design of current portable x-ray units is such that the life of the whole unit is usually limited by the life of the x-ray tube. The x-ray tube is customarily mounted together with a high tension transformer inside a sealed, oiled-filled tank unit. In most cases it is considered uneconomical to attempt any repairs on the sealed unit. Improvements in design that can reduce the number of exposures taken for each examination and reduce the stress on the x-ray tube and transformer during each exposure will naturally prolong the life of the tube and hence the equipment. Furthermore, an emulated, full-wave, rectified, d.c. power delivery to the emission tube of the invented unit reduces the extreme stress to the tube caused by conventional uncompensated, half-wave, rectified, power delivery to the lamp of existing, low-cost portable units.

The design of the invented portable x-ray unit prolongs the life of the unit and corrects the deficiencies of existing units. The improved design provides for accurate calibration within smaller increments, improving the safety of the device for use on humans, where greater care is required.

SUMMARY OF THE INVENTION

The light-weight, portable x-ray unit of this invention has been devised to produce quality x-ray, film images under field conditions with a less than optimum power sources. The portable unit achieves the high quality imagery without the use of a full wave rectifier for conversion of the a.c. source power to a d.c. driving voltage for the high intensity x-ray tube. The devised unit utilizes an emulated full-wave rectified power circuit to preload the a.c. power source with a dummy-load to accurately calibrate the unit for line voltage drop, frequently encountered at the end of long extension cords often used in field conditions.

The calibrated instrument can then be accurately set for the intensity and exposure desired with the internal circuit powering the lamp being designed with emulated full-wave, rectified power circuitry and pre-emission warmup circuitry for reducing shock and excess tension to the emission tube for prolonging the life of the unit. The use of a load during both the positive and negative mode during each cycle magnetizes the transformer core equally in each direction prevention magnetic bias in the core and permitting the core to be fabricated of ordinary quality material for reduced cost.

Other features of the subject portable x-ray unit make the unit ideal for situations where the entity to be x-rayed cannot be moved and it is more convenient to move the x-ray machine to the entity. The invented machine is designed to be inexpensive, yet highly accurate, and is designed to improve the life of key components thereby extending the utility of the unit.

DETAILED DESCRIPTION OF THE PREFERRED EMBODIMENTS

Figure 1:
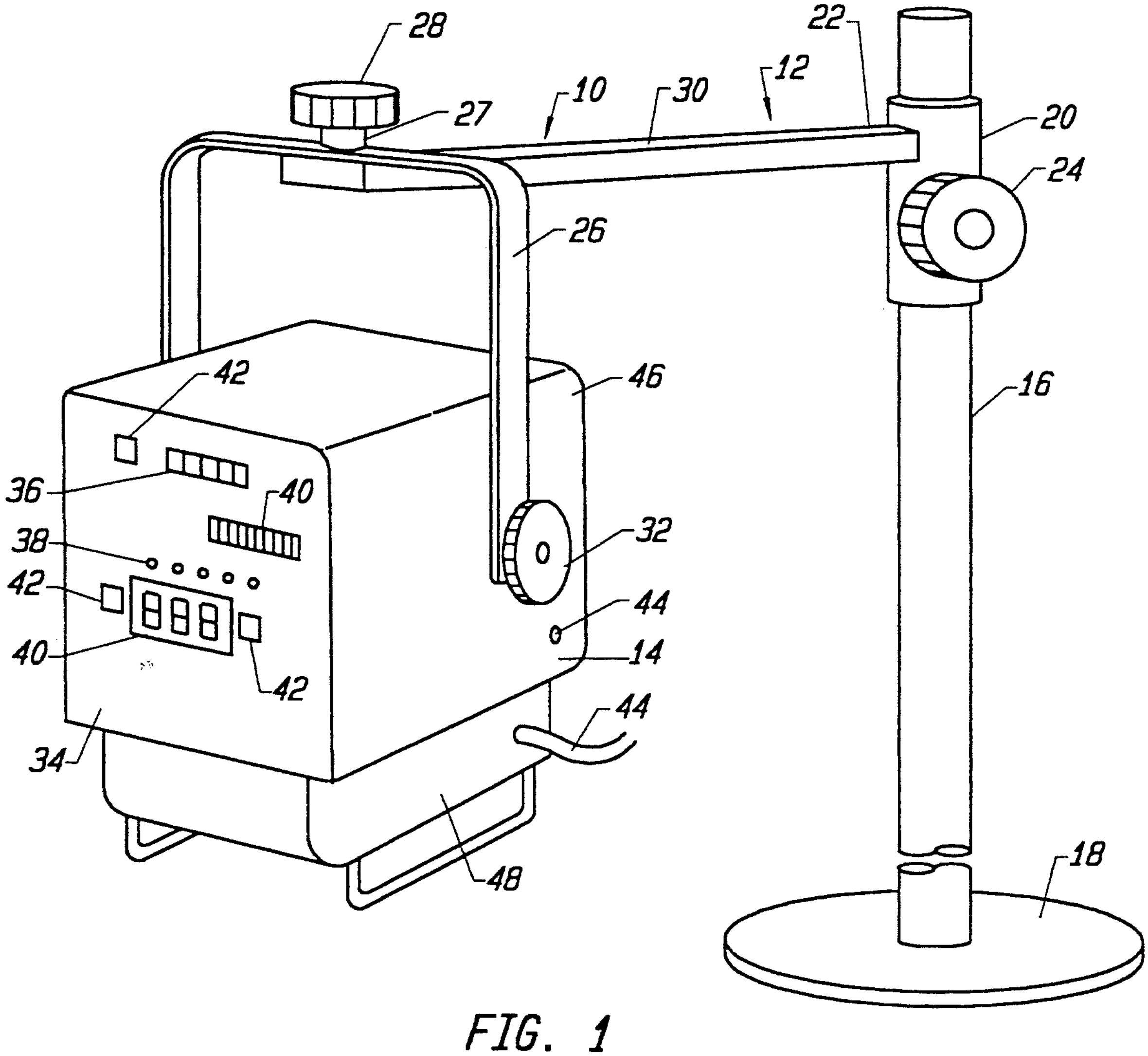
FIG. 1 is a perspective view of the portable x-ray unit.

The improved x-ray machine of this invention is shown in FIG. 1 and comprises a combination of a support structure 12 and a light-weight, x-ray unit 14 supported by the support structure 12. In the embodiment of FIG. 1, the support structure 12 includes a column 16 mounted on a base 18 for supporting a slidable sleeve 20 having an extended cantilever arm 22 and a threaded locking knob 24 for positioning the x-ray unit 14 at any height and axial position around the column 16.

The x-ray unit 14 is suspended from the cantilever arm 22 by a yoke 26. The yoke 26 has a locking knob 28 that engages threaded bolt 27 slidable in a slot 30 in the top of the cantilever arm 22 to enable the x-ray unit 14 to be positioned along the length of the arm 22 and rotate on the vertical axis of the bolt of the locking knob 28. The yoke 26 connects to the x-ray unit 14 by two, side-mounted locking knobs 32 (one visible) to enable the x-ray unit 14 to be pivoted on a horizontal axis with respect to the yoke 26. The support structure 12 essentially allows optimum positioning of the x-ray unit with respect to a patient or object to be examined.

The x-ray unit 14 has a control panel 34 with a series of selection push buttons 36, with indicator lights 38, displays 40 and push buttons 42 for user interface with the internal electronic circuits of the x-ray unit that distinguish the invented unit from prior art devices, and that enable the improved operation previously described. The unit 14 is powered by a power cord 44 connected to a conventional 110–120V AC power source.

The x-ray tube (not visible) is housed within a shielded casing 46 having an aperture (not visible) for permitting x-rays to pass through an auxiliary collimator 48 for directing the x-rays in a suitable pattern to the subject. The components described with reference to FIG. 1 are common to most portable units.

Figure 2:
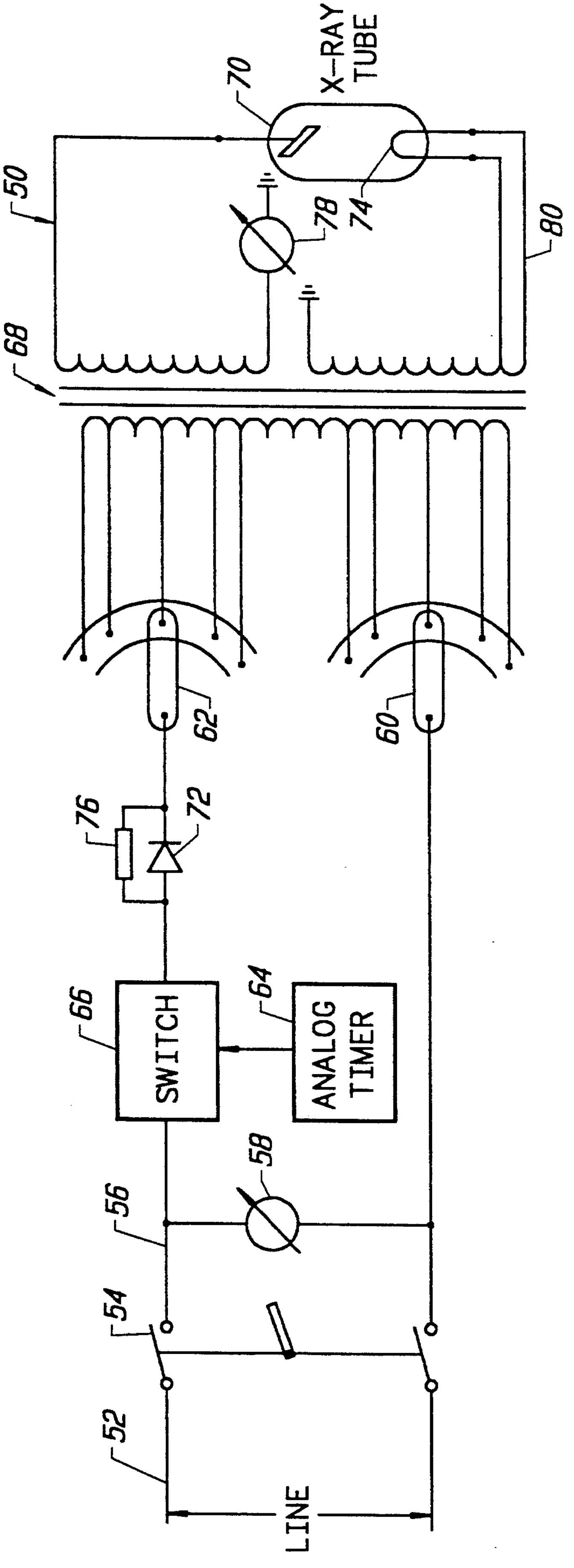
FIG. 2 (PRIOR ART)
FIG. 2 is an electronic schematic diagram of a conventional, prior art unit.

With reference to the schematic drawing of FIG. 2, a typical prior art circuit diagram is shown for the electrical operating circuit of conventional devices. The typical unit 50 is connected to a conventional power line 52 having a 110–120 A.C. voltage. An on/off line switch 54 connects to the internal circuitry 56 of the unit 50 to the power source 52. A line voltage indicator 58 senses and shows the actual supply voltage, but does not take into account the line voltage drop under load resulting from line resistance, which in the case of a long extension cord can be considerable. An operator adjusts a stepping switch 60 to compensate for any variation from a reference voltage, for optimized operation of the device. Usually, the stepping switch 60 adjusts in five volts per step increments, which is quite coarse as each increment will alter the transformed output kilovoltage by as much as five kV. The operator selects the desired output kilovoltage by stepping switch 62, usually within a range from 60–100 kV in five kV steps. Finally, the operator selects the desired exposure time by adjusting the dial of the analog timer 64 that operates in conjunction with throw switch 66 to deliver current through the transformer 68 for high voltage powering for the x-ray tube 70.

As most low cost x-ray units are half wave rectified devices, stresses are placed upon both the transformer 50 and the x-ray tube 70. During exposure, the x-ray tube 70 conducts only when its polarization is positive, that is, only during the positive half of the AC cycle. During this time, the current passes by a diode 72 that presents only a minimal resistance in its forward conductivity mode. During the negative half of the cycle, the x-ray tube does not conduct, and this causes certain problems. The high tension windings of the transformer have a considerable impedance and resistance, and during the forward cycle, there is a substantial drop in the voltage across the windings, which in turn reduces the supplied kilovoltage across the x-ray tube.

Second, the line voltage drop only occurs when the x-ray tube 70 is conducting. In its forward conducting mode, the x-ray tube represents a load of approximately of 1200 watts. This voltage drop does not occur during the negative cycle, resulting in an uneven voltage across the x-ray tube between the negative and positive pole periods. If adjustments are made for the voltage drop in the positive mode, then this could result in an excessive voltage during the negative period of the cycle. To compensate for this problem, the conventional units commonly install a resistor 76 in parallel with the diode 72 to limit the current and hence the maximum voltage of the transformer. However, when using this solution, the transformer is not magnetized equally during the positive and negative cycle and develops a strong magnetic bias that severely reduces its efficiency. The transformer core therefore has to be made of a very high quality magnetic material. A transformer that remains magnetically biased interferes with the ability of the unit to permit extremely short exposures.

In most devices, indicator meter 78 displays the tube current during exposure. In actuality, the filament voltage for the x-ray tube 70 is obtained from the high tension transformer 50 through filament winding 80. The filament 74 is cold prior to switching and application of the high tension voltage to the x-ray tube 70 has a lag period before the filament 74 reaches its operating temperature and therefore its optimum electron emission capacity. Before the filament 74 reaches its full emission capacity, the tube cannot fully conduct, thus the indicator meter 78 may indicate an adequate voltage whereas in exposure times, the actual emission falls short of that desired and renders the instrument unreliable for short exposure times. Additionally, the cold filament 74 is heated by the full value of the tension voltage and causes a severe thermal shock which shortens the life of the x-ray tube 70.

The conventional low cost units do not use any further switching means except for the power switch 54 and the delivery switch 66. The power delivery switch 66 is usually a pair of silicon controlled rectifiers or a triac and, as all semiconductor devices, may fail causing the unit to start generating x-ray emissions immediately when the power switch 54 is turned on until the operator notices that the unit is emitting x-rays and powers the machines off. Unnecessary operation of the x-ray tube occurs and inadvertent radiation can result.

Figure 3:
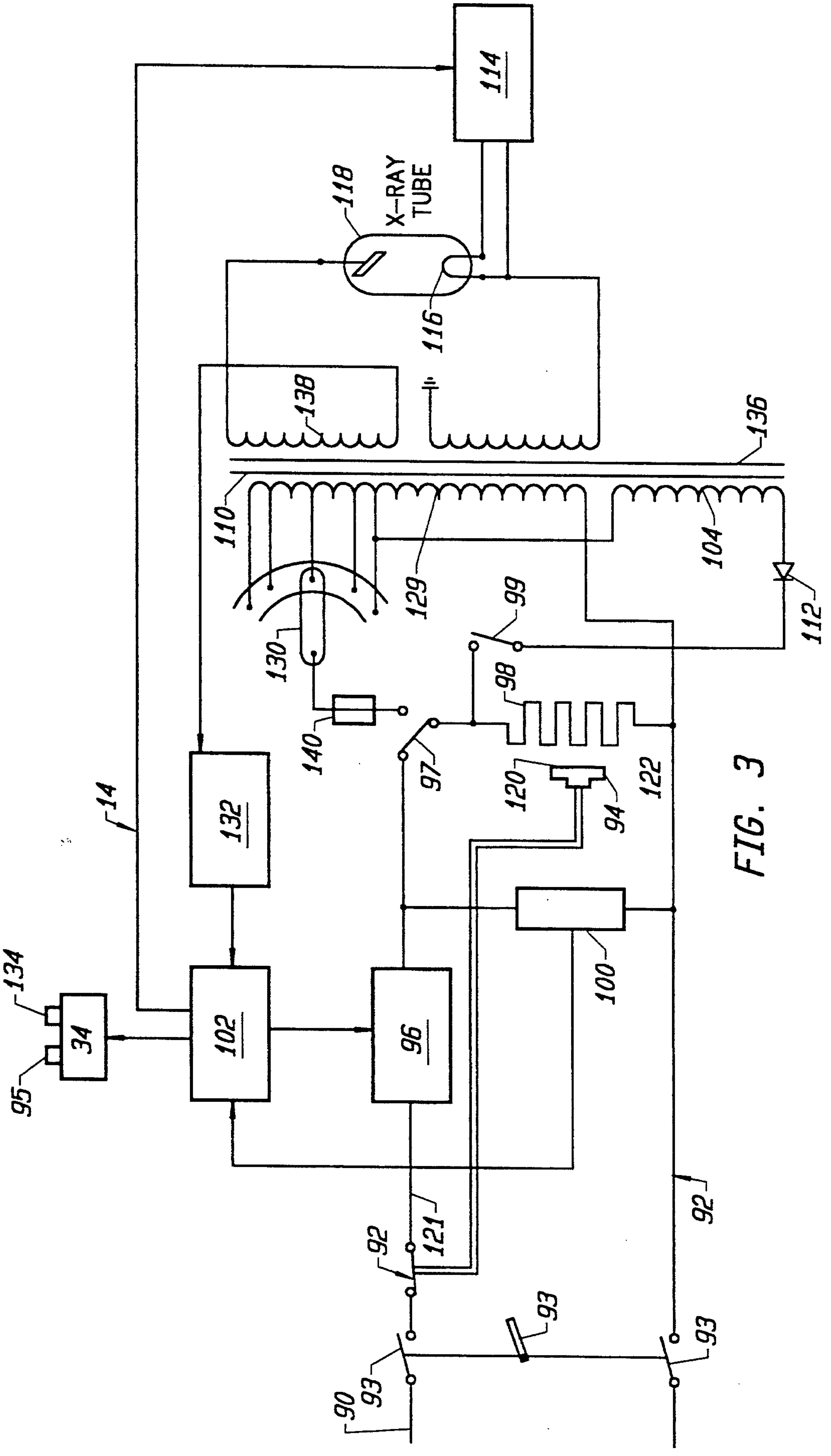
FIG. 3 is an electronic schematic diagram of the portable x-ray unit of this invention.

Referring now to the improved x-ray unit 14 shown in FIG. 3, power from a 110–120V AC line source 90 connects to the internal circuitry 92 of the x-ray unit 14 through power switch 93. The operator turns the unit on by pressing a push button test switch 95 to activate a logic circuit 102 that supplies an "on" command to a solid state, MOSFET switch 96. Without physical depression of the push button switch 95, the unit will not operate. Upon activation of the MOSFET selector switch 96, power is applied to a 1200 watt dummy load 98. Line voltage sensor 100 measures the internal line voltage under the nominal 1200 watt load and an internal logic circuit in the MOSFET switch 96 adjusts its internal resistance to provide for the correct operational delivery voltage when the circuitry switches from the dummy load to the emission load. Logic control circuit 102 memorizes the internal resistance value and turns the MOSFET switch 96 "off" and the selection contacts 97 and 99 are switched from the dummy load to the tertiary winding 104 of the high tension transformer 110 through diode 112. Once this test is completed an indicator light signals to the operator that the unit is switched to the operating mode. A solid state filament controller 114 preheats the filament 116 of the x-ray tube 118. A temperature just below the temperature where emission of electrons occurs is applied such that filament evaporation is reduced to a minimum. Safety switch 94 has a thermal contact 120 that is in physical contact with the resistor 122 of the dummy load 98 such that if the MOSFET switch 96 is faulty and the resistor 122 overheats the thermal contact 120 will trip and a circuit breaker 121 will disconnect the unit from the power supply 90. Once the unit is electronically tested for operation, the operator can select the required intensity and duration of the emission by setting a kilovolt selector 130 and a digital impulse counter 132 that serves as a timer by counting each rectified pulse delivered to the x-ray tube 118. As each pulse is 1/120 of a second the actual exposure time can be correlated to the emission of full-wave, rectified machines or other theoretical, half-wave rectified machines that are correctly calibrated. As the precision of the subject unit is immensely improved, greater reliance can be placed on reference documentation studies and reports, and less reliance need be placed on individual operator skill.

The kilovoltage selection also alters the filament voltage controller 114 to obtain the optimum heating voltage for the filament for a given operating kilovoltage for the tube. After an exposure button 134 is pressed, the switch contact 97 switches from the dummy load to the primary windings for initiating stepped-up voltage transfer to the x-ray tube. The logic circuit 102 regulates the heating voltage controller 114 according to the position of the kilovoltage selector 130 for optimized heating and delays exposure, (usually for 0.8 second) until the filament is heated to its correct emission temperature. The logic circuit 102 applies the correct command signal value to the MOSFET switch 96, as memorized from the test sequence with the dummy load for the local power supply line conditions. The conductivity of the MOSFET switch 96 compensates for the line resistance previously measured and stored during the test cycle.

The tertiary transformer winding 104 is loaded through diode 112 and the dummy load resistor 98 during the negative cycle when the x-ray tube 118 is not conducting. This balances the load on the transformer by providing a normal 1200 watt load in both the positive and negative cycle period preventing magnetization of the transformer core 136. Since the transformer will remain magnetically neutral, a standard quality core material can be used and a very short exposure time can be permitted.

The induced pulses in the secondary, high tension windings 138 are passed to the impulse counter 132 such that the actual number of emission pulses passing through the x-ray tube are counted and compared with the selected emission time to accurately determine the exposure time regardless of its length.

A precontactor 140 between the MOSFET switch 96 and the primary winding 129 of the transformer 110 operates 0.1 second before and after the actual exposure under control of the logic control circuit 102. This protects the tube 118 and operators from exposure in the event the MOSFET switch, for example, fails prior to or during the exposure.

The tertiary transformer winding 104 is slightly overrated to about 1,350 watts to compensate for the voltage drop of the secondary high tension windings. The marginally higher load during the negative cycle allows for more accurate calibration during the test phase when establishing input voltage required for the desired emission level.

Figure 4:
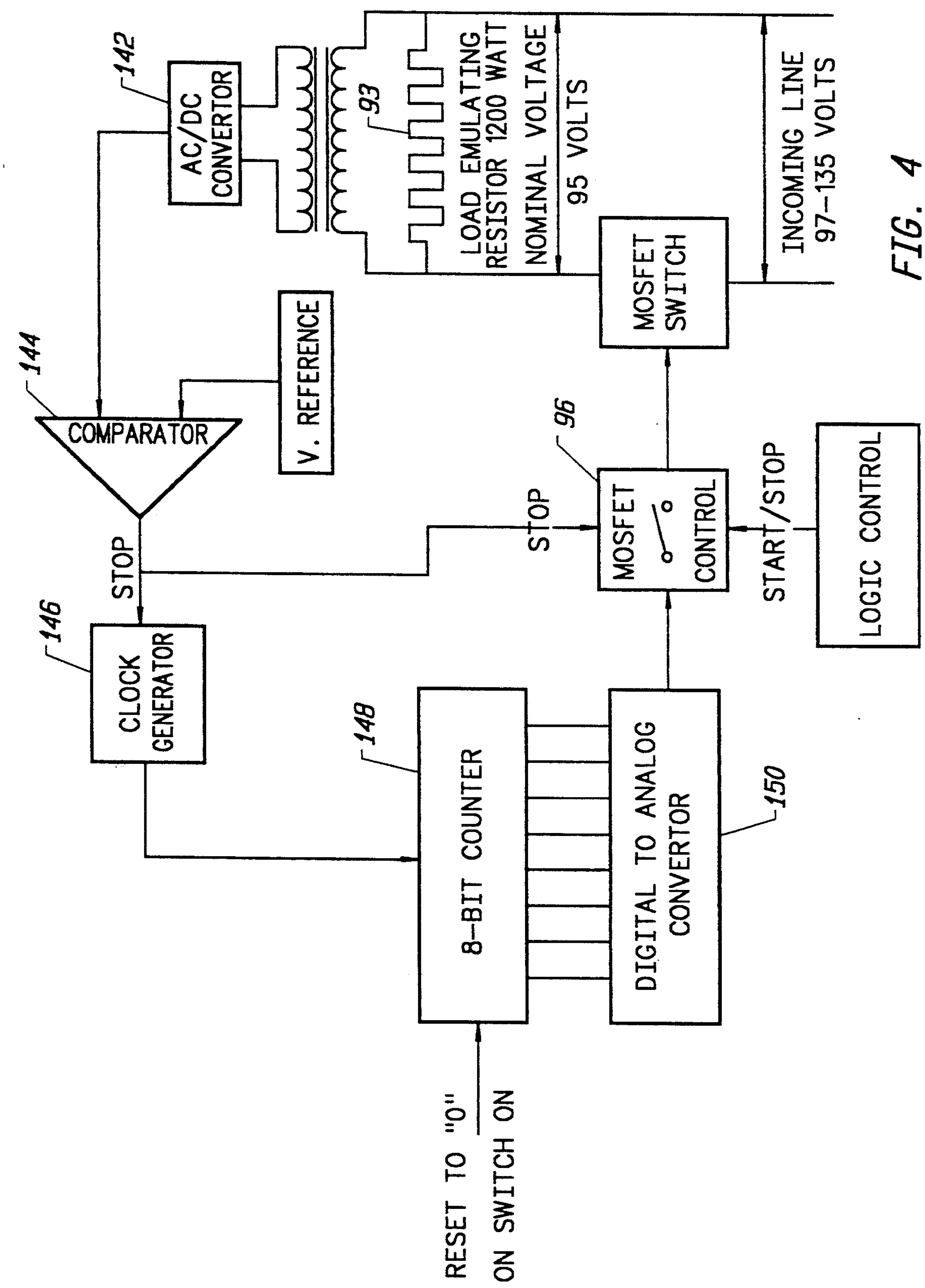
FIG. 4 is a schematic block diagram of the portable unit of this invention.

Referring to FIG. 4, the control circuit 102 for automatic compensation of supply line conditions at the operating local is shown in a schematic. The logic control turns the MOSFET switch 96 on in its minimum permissible conductivity mode for protection of the down line components. The attenuated line voltage is then applied to the load emulating resistor 98 which will load the line to 1200 watts at 95 volts. The voltage across the resistor 98 is measured by the AC/DC converter 142 and applied to a voltage comparator 144. Clock pulses from a clock generator 146 are applied to an 8-bit counter 148 which in turn increases the output voltage of a digital to analog converter 150 that controls the conductivity is of the switch 96.

When the conductivity of the MOSFET switch 96 reaches the level that the voltage across the dummy resistor 98 is 95 volts, the comparator stops the clock pulse generator 146 and turns the MOSFET off. The 8-bit counter will remain in the state where the unit design voltage of 95 volts was reached, thereby storing the correct magnitude of the MOSFET control voltage that will be applied during actual operation. This procedure thereby compensates for the actual line voltage under calibrated load conditions that are usual to a reference load condition of the emitting x-ray tube. Actual operation of the x-ray tube will have a kilovoltage variation within ±3% of the selected kilovoltage for a particular x-ray exposure.

Once the test sequence is completed, the logic circuit disables the automatic compensation circuit from further changes, unless the power switch 93 is thrown. Control of the MOSFET switch is transferred to the impulse timer. The 8-bit counter is reset to zero whenever the x-ray unit 14 is switched on.

If the line voltage is too low, (under 97 volts) such that a minimum emission level cannot be achieved, or too high, such that component damage might occur, a safety circuit will intervene and the operator will be signalled to take corrective action to change the power point or take other steps to adjust the line voltage.

Since the circuit control can be implemented using conventional components to effect the functions described, the cost of the portable unit can be maintained competitive with devices not incorporating the calibration and safety features described.

While, in the foregoing, embodiments of the present invention have been set forth in considerable detailed for the purposes of making a complete disclosure of the invention, it may be apparent to those of skill in the art that numerous changes may be made in such detail without departing from the spirit and principles of the invention.

What is claimed is:

1. A portable x-ray unit for controlled emission of radiation comprising:
   - a shielded casing having an x-ray tube with a voltage-select having a conducting mode and a non-conducting mode;
   - a transformer for delivering high voltage to the x-ray tube from an a.c. power source, wherein the transformer has a primary winding connected to the a.c. power source and a secondary winding connected to the x-ray tube; and
   - electronic circuit means for emulating a full-wave, rectified power delivery to the transformer, wherein the electronic circuit means includes a dummy load and the transformer has a tertiary winding connected to the dummy load, wherein the secondary winding and the x-ray tube comprise a power load for the transformer in the conducting mode of the x-ray tube, and the tertiary winding and the dummy load comprise a power load for the transformer in the non-conducting mode of the x-ray tube.

2. The unit of claim 1 further comprising load simulator means for calibrating the operational line voltage under actual load prior to delivering high voltage to the x-ray tube.

3. The unit of claim 1 wherein the electronic circuit means includes a timer means for timing x-ray emissions, the timer means including means for counting cycles pulses initiated by the source and limiting radiation emission to a select number of pulses.

4. A portable x-ray unit for generating x-ray radiation comprising:

x-ray emission tube for emitting x-ray radiation;

electronic circuitry for controlling the emission of x-ray radiation from the emission tube;

power means including a power line for delivering a.c. current to the unit; and calibration means for calibrating the x-ray unit to compensate for power line voltage drop during operation of the unit, wherein the calibration means includes a load simulation means for operating the unit under load simulation without emitting radiation and the electronic circuitry includes means for operating the unit with the load simulation means prior to delivering power to the x-ray emission tube.

5. The x-ray unit of claim 4 including a transformer and full-wave rectifier emulation means for driving the transformer in combined positive and negative operating modes, wherein the transformer is subject to substantially identical load conditions in the positive operating mode and the negative operating mode.

6. The x-ray unit of claim 5 wherein the full-wave rectifier emulation means included a dummy load, and the transformer has a primary winding connected to the power means for delivering a.c. current to the unit, a secondary winding connected to the x-ray emission tube, and a tertiary winding connected to the dummy load, wherein the x-ray emission tube in the positive operating mode comprises a power load for the conducting mode of the x-ray emission tube, and the dummy load in the negative operating mode comprises a substantially equivalent power load for the non-conducting mode of the x-ray emission tube.

7. The x-ray unit of claim 4 wherein the electronic circuitry includes circuit means for preheating the x-ray tube.

8. The x-ray unit of claim 7 wherein the x-ray tube has a filament and the circuit means for preheating the x-ray tube includes a safety shut-off component to prevent overheating of the filament.

* * * * *